INVENTOR.
HARRY S. JONES
BY C. B. Spangenberg
ATTORNEY

Patented Dec. 11, 1945

2,390,793

UNITED STATES PATENT OFFICE 2,390,793

CONTROL APPARATUS

Harry S. Jones, Washington, D. C., assignor to
The Brown Instrument Company, Philadelphia,
Pa., a corporation of Pennsylvania Application June 13, 1942, Serial No. 446,946

9 Claims. (Cl. 172—239)

The general object of the present invention is to provide improvements in electrical control systems of the proportioning type.

More specifically stated, the general object of the present invention is to increase the flexibility and capacity for adjustment of a control system of the type specified, by combining therein a plurality of separate bridge circuits, two different points of each of which are connected into a control circuit through which the operation of a reversible electric motor is controlled to produce suitable control actions, such, for example, as the adjustments of the fuel valve of a heating furnace. By thus combining a plurality of bridge circuits in my improved control system I obtain the advantage that sensitivity and/or other adjustments of one bridge circuit may be made without directly modifying the condition of any other bridge circuit, or the relation of the latter to other portions of the control system.

The various features of novelty which characterise my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of the invention.

Figure 1:
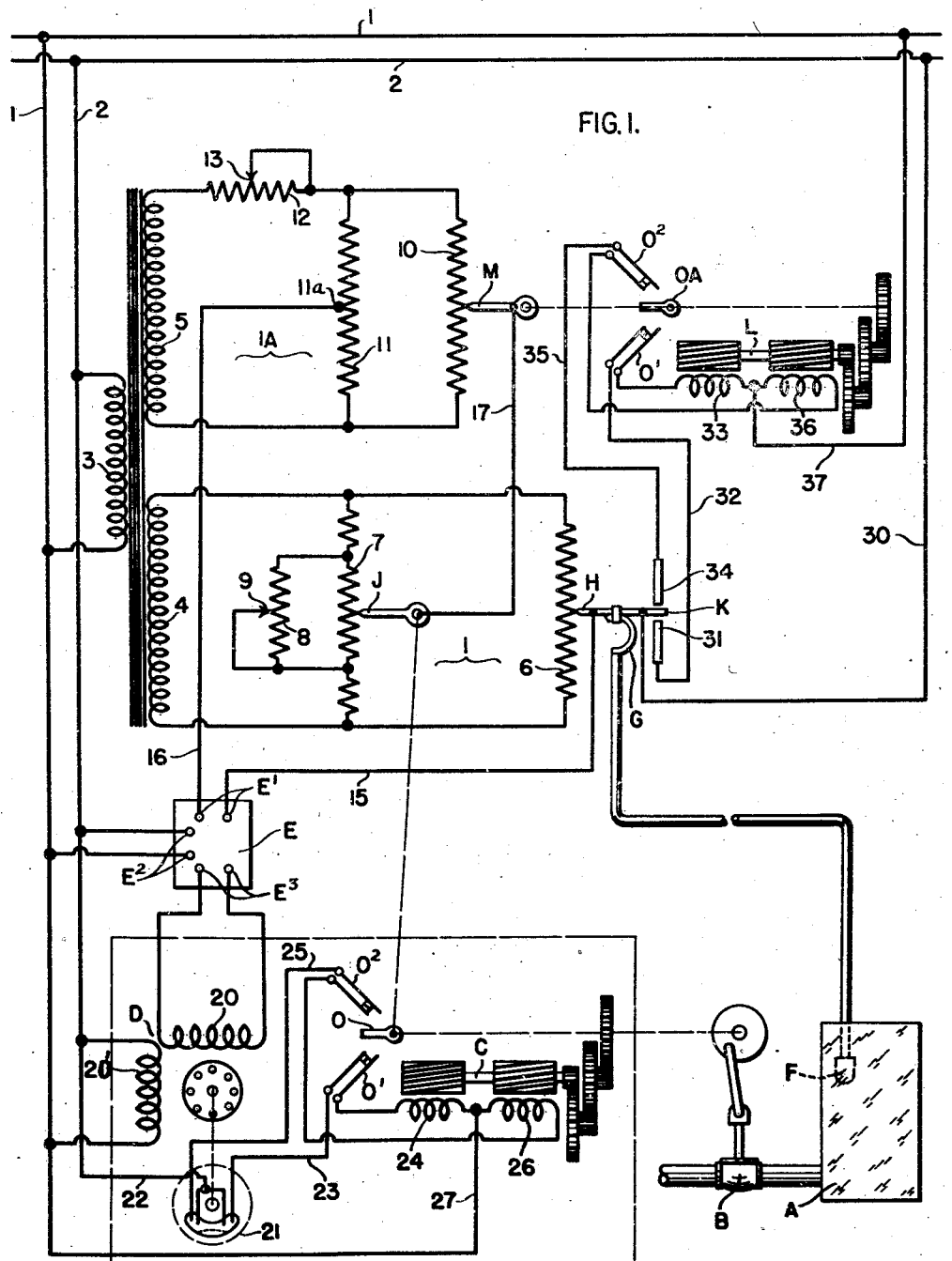
Fig. 1 is a diagrammatic representation of a control system.

In the embodiment of my invention diagrammatically illustrated in Fig. 1, a furnace or heater A is supplied with fluid fuel at a rate dependent upon adjustment of a fuel valve B. The latter is mechanically connected to and adjusted by the rotative movements of a reversible electric control motor C. The operation of the motor C is directly controlled by a reversible electric motor D, and the latter is controlled through means including an electronic amplifier E, by a thermometric element F, shown as a thermometer bulb, which is responsive to the temperature of the heater A. The general purpose of the control system shown in Fig. 1 is to give the fuel valve B opening and closing adjustments as required to maintain an approximately constant furnace temperature condition.

A change in the furnace temperature produces a change in bulb pressure in the bulb F which is transmitted to a Bourdon tube G. The expansion and contraction of the tube G gives corresponding movement to a contact H which is thereby adjusted along the length of a resistor included in a Wheatstone bridge I. The latter includes another resistor along which a contact J is adjusted by and in accordance with the movements of the control motor C. The expansion and contraction of the Bourdon tube G also gives movements to a contact K, and thereby, as is hereinafter explained, controls the operation of a reversible electric reset motor L. The movements of the latter give corresponding movements to a contact M thereby adjusted along the length of a resistor included in a second Wheatstone bridge circuit IA.

As shown in Fig. 1, the two bridge circuits I and IA are energized by alternating current supply conductors 1 and 2 through a transformer which includes a primary coil 3 and two secondary coils 4 and 5. Primary coil 3 is connected across the supply conductors 1 and 2. The secondary coil 4 is the direct energizing element of the bridge I which includes resistors 6 and 7 connected in parallel with one another to the terminals of the coil 4. The resistor 6 is engaged at a variable point along its length by the slider contact H, and the resistor 7 is engaged at a variable point along its length by the slider contact J. A resistance 8 is connected in shunt to the intermediate portion of the resistor 7 along which the contact J moves. Associated with the resistance 8 is a contact 9 manually adjustable to short circuit and render inoperative, more or less of the resistance 8, and thereby vary the so called throttling range of the control system.

The secondary transformer coil 5 forms the direct energizing element of the bridge circuit IA which includes resistors 10 and 11. Those resistors are connected between the terminals of the coil 5 in parallel with one another and each in series with a resistance 12. The previously mentioned contact M is adjusted by the operation of the reset motor L along the resistor 10. A contact 13 manually adjustable along the resistance 12 forms a means for short circuiting of that resistance 12, and thereby regulating the rate of reset effected by the motor L.

Figure 2:
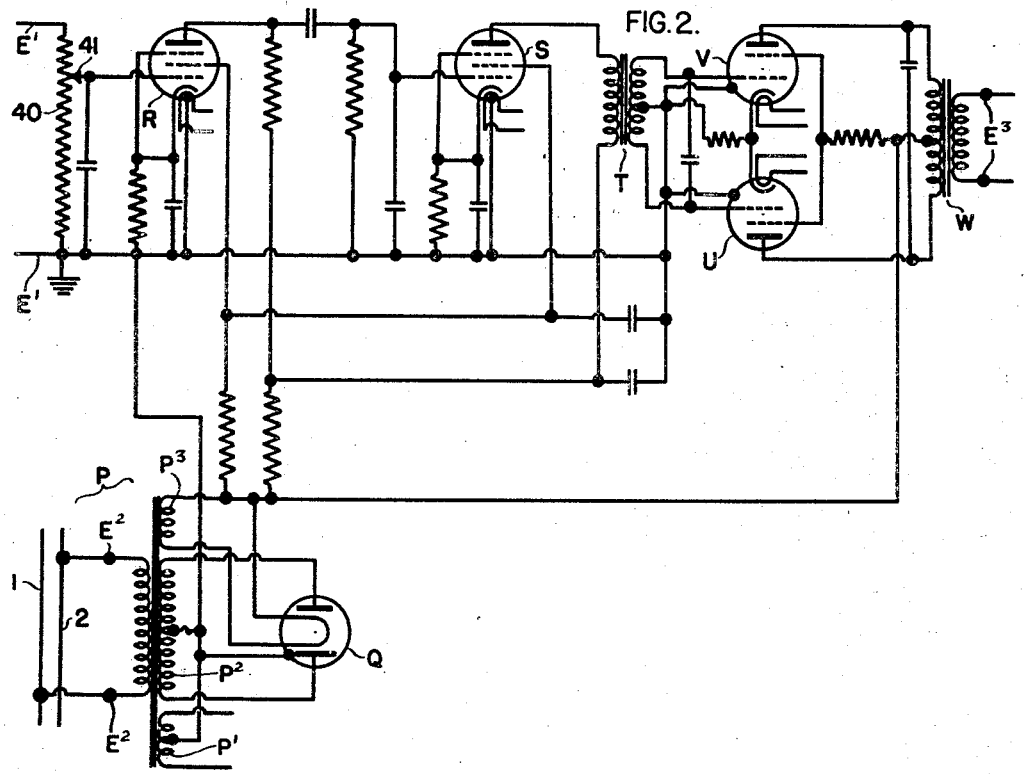
Fig. 2 is a diagram illustrating an electronic amplifier included in the apparatus shown in Fig. 1.

The amplifier E which is diagrammatically shown in detail in Fig. 2, and which is of known type, comprises input terminals E', energizing terminals E², and output terminals E³. One input terminal E', is connected by a conductor 15 to the contact H, while the other is connected by a conductor 16 to the midpoint 11a of the resistor 11. A conductor 17 connects contacts J and M. The input terminals E¹ of the amplifier E are thus connected in series with the movable contacts H, J and M and resistor midpoint 11a in a control circuit, associated with the two main resistors of each of the two bridges I and IA. One of the energizing terminals E² is connected to the supply conductor 1, and the other is connected to the supply conductor 2.

As diagrammatically shown, the control motor D is a reversible two phase motor having one winding 20 connected between the amplifier output terminal E³ and having a second winding 20' connected between the supply conductors 1 and 2. On the adjustment of the contact H away from its neutral or intermediate position as the furnace temperature to which the bulb F responds rises above or falls below a predetermined normal value, a current flow is set up in the control circuit including the amplifier input terminals E'. The phase of the control circuit current flow will lag behind or lead the phase of the voltage between the supply conductors 1 and 2 approximately 90° accordingly as the contact H is displaced from its neutral position in one direction or the other. When the phase of the current flow in the control circuit lags behind the supply circuit voltage, the windings 20 and 20' co-operate to give a turning movement to the rotor of the motor D in a direction which is opposite to that of the movement given the rotor when the phase of the current flow in the control circuit leads the supply voltage.

The control motor D is biased to an intermediate position, from which it is adapted to make a slight turning movement in one direction or the other and thereby angularly adjust a mercury switch 21 in a clockwise or counter clockwise direction from the open or neutral position of the switch. The motor D and switch 21 need not be further described herein as they form no part of the present invention and are of types fully disclosed in my prior Patent 2,246,686, granted June 24, 1941. When the switch 21 is turned clockwise out of its neutral position, which is that shown in Fig. 1, it connects conductors 22 and 23. The conductor 22 is connected to the supply conductor 2 and the conductor 23 is connected to one terminal of the winding 24 of the motor C. On a counter clockwise adjustment of the switch 21 away from its neutral position, the switch connects the conductor 22 to a conductor 25 which is connected to a terminal of the second motor winding 26. The second terminals of the windings 24 and 26 are connected by conductor 27 to the supply conductor 1.

If on an increase above normal of the temperature of the thermometer bulb F, the control motor D is actuated in the direction to give a clockwise adjustment to the switch 21, thereby energizing the winding 24, the motor C should then operate in the direction to give a closing adjustment to valve B and thus reduce the heat supply to the furnace A. With the apparatus so arranged, a reduction in the temperature of the bulb F below its normal value will result in an energization of the motor winding 26 and an operation of the motor C in the direction to open the valve B. The conductors 23 and 25 are connected to the windings 24 and 26, respectively, through limit switches 0' and 0². One or the other of said limit switches is opened by an arm O rotated by the motor C when the valve B is given the maximum desired closing or opening adjustment.

As the Bourdon tube G departs from its neutral position as a result of the attainment of a subnormal temperature by the bulb F, the contact K engages a stationary contact 31. The latter is connected by a conductor 32 to one terminal of the winding 33 of the reset motor L. Conversely, when the bulb temperature rises above the normal, the contact K is moved into engagement with a second stationary contact 34. The latter is connected by a conductor 35 to one terminal of the second winding 36 of the motor L. The second terminals of the windings 33 and 36 are connected by a conductor 37 to the supply conductor 1, and the contact K is connected by a conductor 30 to the supply conductor 2. Limit switches O' and O² included in series with the motor windings 33 and 36, respectively, are opened by an arm OA rotated by the motor L, when one or the other end of the desired range of reset adjustment is reached.

As previously indicated, the amplifier E may be of any known or suitable type, and, as shown, it is of a type and form fully described in my prior Patent No. 2,246,686, granted June 24, 1941. As diagrammatically illustrated in Fig. 2, the amplifier E includes energizing provisions comprising a transformer P having its primary coil connected through the amplifier terminals E² to the supply conductors 1 and 2, and having a plurality of secondary windings P', P², and P³. The secondary winding P' supplies filament current to the electronic amplifier valves. The secondary winding P² is connected to the anodes of a full wave rectifying tube Q. The secondary winding P³ supplies filament current to the rectifier tube Q.

The amplifier E shown in Fig. 2 comprises an electronic valve R of the heater type pentode, operatively connected to the amplifier input terminals E' by means of a voltage divider including a resistor 40 and a sliding contact 41 adjustable along the latter to vary the sensitivity of the control of the motor C. The output circuit of the valve R is resistance-capacity coupled to the input circuit of a second electronic valve S, also shown as of the heater type pentode. The valve S has its output circuit connected by a transformer T to the input circuits of similar electronic valves U and V, each of which is of the heater type tetrode, and preferably of the type known commercially as beam-power amplifier tubes. The valves U and V, preferably and as shown, are connected in push pull. The anodes of the valves U and V are connected to the terminals of the primary of a transformer W, the secondary of which is connected to and energizes the amplifier output terminals E³ across which the coil 20 of the motor D is connected.

Inasmuch as the amplifier arrangement shown in Fig. 2 is identical with an amplifier arrangement illustrated and described in detail in my prior Patent No. 2,246,686, further description herein of the amplifier E is unnecessary.

In the operation of the control apparatus shown in Fig. 1, the contact J and H which form the output terminals of the bridge circuit I, impose a potential on the control circuit in which they are included only when the potentials of said contacts are different. The potential impressed on the control circuit by contacts J and H will be in one direction or the other, accordingly as the potential of the contact H is higher or lower than the potential of the contact J. Similarly the midpoint 11a of the resistor 11 and the contact M which form the output terminals of the bridge circuit IA, impress a potential on the control circuit in one direction or the other when the potential of the contact M is respectively greater or less than the potential at point 11a, and impress no potential on the control circuit when the point 11 and contact M are at the same potential.

When the furnace heat requirement is such that the temperature of the bulb F is maintained at its normal, or control point, value with the fuel valve B in its intermediate adjustment position, the potential of the contact J is the same as the potential of the contact H, and the potential of the contact M is the same as the potential of the point 11a. With the control system thus balanced under the ideal or average load condition, no potential is impressed on the control circuit by the output terminals of either of the bridge units I and IA.

On an increase in the furnace heat requirement and the resultant decrease of the temperature of the bulb F below its normal value, the Bourdon tube G lowers the contacts H and K and this down movement of the contact H creates a potential difference between the output terminals of the bridge I and thereby creates a current flow in the control circuit including the amplifier input terminals E'. This results in a current flow in the output circuit of the amplifier E which includes the winding 20 of the motor D and causes that motor to effect an adjustment of the switch 21 which results in the operation of the motor C in the direction to give an opening adjustment to the valve B, and to lower the contact J. The movements of the motor C and contact J thus initiated, continue until the system is rebalanced and current ceases to flow in its control circuit, or until the limit switch O² is opened.

But for the operation of the reset motor L, the control system would be rebalanced and the operation of the motor C would be interrupted as soon as the down movement of the contact J makes the potential of the latter equal to that of the contact H. At that time assuming no change in the load requirement in the meantime, the temperature of the bulb F would necessarily have a value slightly lower than its normal value. However, the reset motor L which is started into operation as soon as the contact K engages contact 31, then operates to adjust the contact M in the downward direction and thereby creates a potential difference between the output terminals 11a and M of the bridge circuit IA, which maintains current flow in the control circuit, and thereby continues the operation of the motor C, when the potential of the contact J becomes equal to the potential of the contact H. The resultant further down movement of the contact J creates a potential difference between that contact and the contact H which is opposite in direction in its effect on current flow in the control circuit, to the potential difference between point 11a and contact M. In practice the system may be proportioned so that the effect on the current flow in the control circuit of the movements of the contacts J and M occurring after the contact J reaches the level of the contact H, will neutralize one another.

Under the normal operating condition in which the furnace heat requirement is within the operative range of the fuel valve adjustment effected by the motor C, the temperature of the bulb F will eventually be restored to its normal value and the contacts H and K will be returned to their neutral positions, thereby de-energizing the reset motor L. When the operation of the reset motor is thus interrupted, the contacts J and M will each be displaced from its neutral by an amount proportional to the difference between the actual furnace heat requirement and the ideal or average heat requirement which permits the temperature of the bulb F to be maintained at its normal value with the fuel valve B in its intermediate position.

The general cycle of control operations described above will be repeated on any subsequent departure of the temperature of the bulb F from its normal value. When that departure is a temperature increase, the contacts H and K move upward from their neutral positions, and the resulting adjustments of the contacts J and M will also be in the upward direction.

While the general operative results above described are obtainable with an electrical proportioning control system including a reset motor and a control motor associated with a single bridge circuit, the combination of two bridge circuits such as the circuits I and IA, in the control system, permits of desirable independent adjustments of the two bridge circuits. Thus, with the particular arrangement shown in Fig. 1, the throttling range adjustment of the control system may be varied by adjustment of the contact 9 of the bridge circuit I without disturbing the reset rate, and the adjustment of the contact 13 of the bridge circuit IA, respectively decreases or increases the rate of reset effected by the motor L without interfering with or modifying the throttling range adjustment.

Figure 3:
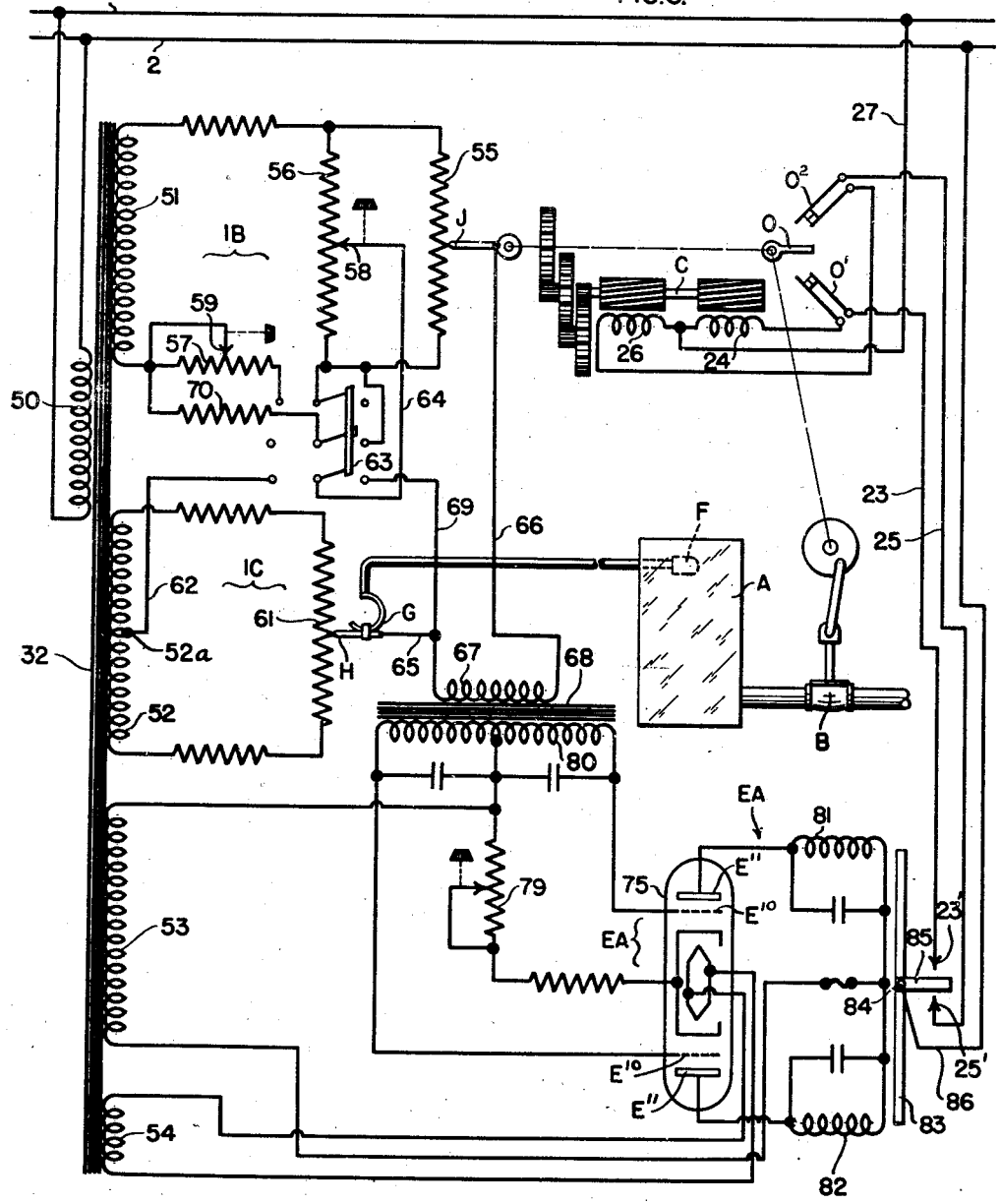
Fig. 3 is a diagrammatic representation of a modified form of control system.

In Fig. 3 I have illustrated a control system like that shown in Fig. 1, in that it includes a fuel valve B for a furnace or heater A, and a reversible control motor C which adjusts the valve B in response to adjustments of a bridge contact H which are effected by means comprising a thermometer bulb F responsive to the temperature of the heater. The control system shown in Fig. 3 is also like that shown in Fig. 1, in that it comprises two bridge circuits IB and IC, different points of which are connected into a control circuit operative through an amplifier EA to control the motor C. The amplifier EA and associated motor control means of Fig. 3 are simpler in type than the amplifier E and associated control parts D and 21 of Fig. 1, and each of the bridge circuits IB and IC differs somewhat from each of the circuits I and IA of Fig. 1.

The control system shown in Fig. 3 includes a transformer having a primary coil 50 connected between supply conductors 1 and 2, and having bridge circuit energizing secondaries 51 and 52, and amplifier energizing secondaries 53 and 54. The secondary winding 51 energizes the bridge IB which comprises two slide wire resistors 55 and 56, connected in parallel with one another and in series with a resistor 57 between the terminals of the secondary 51 when a switch 63 is thrown to its left hand position for automatic control. The resistor 55 is engaged at a variable point along its length by the control motor slider contact J. The resistor 56 is engaged at a variable point along its length by a manually adjustable slider contact 58. A contact 59 manually adjustable along the resistance 57 forms a means for short circuiting more or less of the latter. The secondary winding 52 forms the energizing element of the bridge circuit IC, which includes slide wire resistor 61 connected in series with some resistance to the terminals of the secondary 52.

The midpoint 52a of the secondary winding 52 is connected by a conductor 62, switch 63, and conductor 64 to the contact 58 of the bridge IB, when the switch 63 is turned into its left hand position. The contacts H and J of Fig. 3 are connected by conductors 65 and 66, to the primary winding 67 of a transformer 68, and with the switch 63 in its left hand, automatic control position, the relative positions of the contacts H and J determine the energizing potential impressed on the primary of transformer 68 and thereby determine the bias potential impressed on the amplifier EA.

When the switch 63 is shifted into its right hand position, the bridge circuit IC ceases to exert any control function, and bridge IB may then be used to manually control the motor C by adjusting the contact 58 along the slide wire resistor 56. In such manual control, the amount of grid bias potential impressed on the amplifier EA depends upon the relative positions of the contacts J and 58, the latter being then connected by a conductor 69 to the same terminal of the transformer coil 67 to which the contact H is connected. When the switch 63 is adjusted into its right hand position for manual control operation, it substitutes a resistance 70 of fixed value for the resistance 57 in the energizing circuit to bridge IB. This makes it practically feasible to adjust the valve from its fully closed to its wide open position, by a movement of the contact 58 from one end to the other of the resistor 56. Since resistance 70 is fixed in value, a given adjustment of contact 58 always produces a corresponding adjustment of valve B.

The electronic amplifier EA of Fig. 3 comprises an electronic valve 75 including a pair of triodes within a common envelope. The cathodes of the two triodes are connected through an adjustable resistance 79 to the midpoint of the secondary winding 80 of the transformer 68. The winding 80 has one end connected to one, and has its other end connected to the second of the two triode control grids $E^{10}$. A relay winding 81 is included in circuit with the anode E'' of one triode, and a relay coil 82 is included in circuit with the anode E'' of the other triode. Both triodes are supplied with anode voltage by the transformer secondary winding 53, and the secondary winding 54 supplies filament current to both triodes.

The relay windings 81 and 82 act differently on an armature 83, pivoted at 84, and provided with a contact 85 movable between end positions, in one of which it engages one, and in the other of which it engages the second of a pair of contacts 23' and 25', to which the energizing conductors 23 and 25 of the motor C are respectively connected. In the balanced condition of the control system, the contact 85 occupies an intermediate position and neither of the motor windings 24 and 26 is energized. When the control system is unbalanced by a decrease below normal of the furnace temperature to which the bulb F responds, the armature 83 is tilted to bring the contact 85 into engagement with one of the contacts 23' and 25', and thereupon energizes the motor C for operation in the direction to give an opening adjustment to the fuel valve B. This opening adjustment of the fuel valve terminates when the corresponding adjustment of the contact J is sufficient to neutralize the effect on the motor control circuit of the initial adjustment of the contact H. If, when the control temperature falls below normal, the contact 85 engages the contact 25' and energizes the winding 26, when the furnace temperature rises above normal the contact 85 will engage the contact 23' and energize the winding 24 and thereby cause the motor C to give a closing adjustment to the valve B.

The control system shown in Fig. 3 includes no provisions for effecting an automatic reset or compensating action. Automatic reset may readily be provided, however, by associating with the control apparatus shown in Fig. 3, a reset motor and bridge circuit IA, in the same manner in which the motor L and bridge circuit IA of Fig. 1 are associated with corresponding control parts in Fig. 1.

Figure 4:
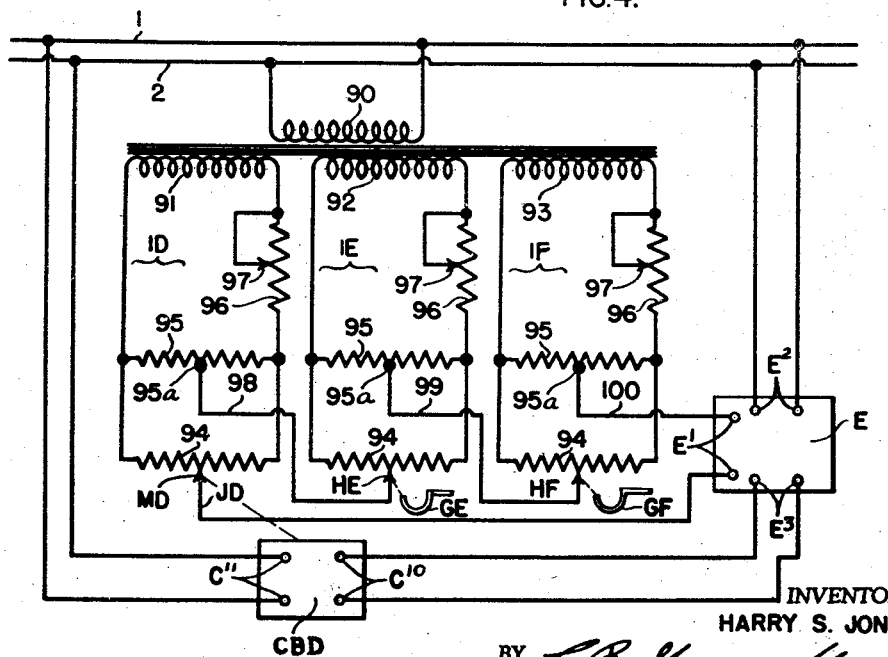
Fig. 4 is a diagrammatic representation of a third form of control system.

In the form of my invention illustrated by way of example in Fig. 4, use is made of three bridge circuits ID, IE and IF, which include as their respective energizing elements, the secondary windings 91, 92 and 93 of a transformer which has its primary winding 90 connected between supply conductors 1 and 2. As shown, the three bridge circuits IE, ID and IF are all alike, each including a slide wire resistor 94 and a second resistor 95, connected in parallel with one another and in series with a resistance 96 between terminals of the corresponding transformer secondary 91, 92 or 93. Each bridge circuit includes a manually adjustable contact 97 which forms a means for short circuiting more or less of the corresponding resistance 96.

A control element GE, shown as a Bourdon tube, adjusts a slider contact HE along the resistor 94 of the bridge IE, and a second control element GF, also shown as a Bourdon tube, adjusts a slider contact HF along the resistor 94 of the bridge circuit IF, and a regulator element CBD adjusts a contact MD along the resistor 94 of the bridge ID. The regulator element CBD includes means collectively corresponding, or analogous in function to the previously described motor C, fuel valve B operated by said motor, and motor control means D and 21 for said motor. The midpoint 95a of the resistor 95 of the bridge ID is connected by a conductor 98 to the contact HE. The resistor midpoint 95a of bridge IE is connected by a conductor 99 to the contact HF, and the resistor midpoint 95a of the bridge IF is connected by a conductor 100 to one of the input terminals E' of an amplifier E, which may be like the amplifier E of Figs. 1 and 2. The second input terminal of the amplifier E of Fig. 4 is connected to the contact MD. The output terminals $E^3$ of the amplifier E are connected to the control terminals $C^{10}$ of the regulator element CBD, which also includes energizing terminals $C^{11}$ connected between the supply conductors 1 and 2.

The particular control system shown in Fig. 4 is well adapted for use under conditions in which contacts HE and HF are adjusted in accordance with variations in related control quantities, and in which the regulating element CBD effects control actions in accordance with the resultant, or algebraic sum, of the adjustments given the contacts HE and HF. For example, the system of Fig. 4 may be used for furnace control with the pressure in the Bourdon tube GE varying with the temperature at one furnace point, and with the pressure in the Bourdon tube GF varying with the temperature at a second point of the furnace, at which the temperature normally increases or decreases when the temperature at the first mentioned point increases or decreases, respectively. In such case the effect of a simultaneous decrease or increase in both temperatures is to produce a greater corrective valve, or other control, adjustment than would be produced by one only of the two temperature changes. On the other hand, under an abnormal condition in which the temperature at the one furnace point increases, while the temperature at the other point decrease the resulting control action, if any, is proportional to the algebraic sum of the two temperature changes, and prevents the overadjustment of the fuel valve or other control element in one direction or the other, which would then occur if the adjustment were responsive to the change in one only of the two temperatures.

As will be apparent, the effect of an adjustment of contact 97 along the resistance 96 of the bridge ID is to change the throttling range of the control system, while the effect of an adjustment of either of the other two contacts 97 to increase or decrease the amount of resistance 96 in the corresponding bridge circuit, respectively, is to decrease or increase the effect of a given change in the position of the corresponding control contact HE or HF, on the over-all action of the control system.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent, is:

1. An electric control system comprising in combination a plurality of separate bridge circuits each of which has two output terminals and includes at least one resistor and a slider contact adjustable along said resistor and forming one of said output terminals, said system including three such resistors and sliders and a fixed output terminal, means connecting all of said output terminals in a control circuit, a reversible control motor controlled by said control circuit and operating in accordance with the direction of current flow therein to produce a control effect and to adjust one of said slider contacts, means for adjusting another of said slider contacts in accordance with the direction and extent of the departure of a control quantity from a normal value of the latter, means operable independent of the last mentioned means and of said motor for adjusting the third slider contact whereby the adjustment of each slider may be effected without affecting the balance of any bridge circuit not including the resistor along which said slider contact is adjusted and adjusting means individually associated with one, at least, of said bridge circuits for adjusting said bridge circuit and thereby varying the effect produced by a given adjustment of the slider contact of the last mentioned bridge circuit on the current flow in the control circuit.

2. A control system as specified in claim 1 in which each of the bridge circuits includes a second resistor connected in parallel with the said resistor along which the slider contact is adjustable and in which a midpoint of said second resistor forms the second of the output terminals of the bridge circuits.

3. A control system as specified in claim 1 including adjusting means individually associated with each of said bridge circuits for adjusting the latter and thereby varying the effect produced by a given adjustment of its slider contact on the current flow in the control circuit.

4. A control system as specified in claim 1 including an electronic amplifier having input terminals connected in said control circuit and having output terminals connected to and energizing means through which said control circuit controls the operation of said control motor.

5. An electric control system comprising in combination a bridge circuit including two resistors connected in parallel and two slider contacts respectively adjustable along said resistors, means for adjusting one of said slider contacts in accordance with the direction and extent of the departure of a control quantity from a normal value of the latter, a reversible control motor operating to produce a control effect and to adjust the second of said slider contacts in accordance with the control effect produced, a second bridge circuit including two resistors connected in parallel and a slider contact adjustable along one of said resistors, means connecting the midpoint of the second of the two last mentioned resistors and all of said slider contacts in a control circuit, and means responsive to current flow in said control circuit controlling the operation of said control motor, a reversible reset motor and energizing means responsive to the departure of the value of said control quantity from the normal value thereof for operating the last mentioned motor to adjust the said slider contact of said second bridge circuit when the value of said control quantity differs from the normal value thereof.

6. An electric control system comprising in combination a control motor, three bridge circuits each including a resistor, a slider contact adjustable along said resistor, and a second resistor connected in parallel with the first mentioned resistor, means for adjusting the slider contact of one of said circuits in accordance with variations in the value of a control quantity, means for adjusting the slider contact of another of said circuits in accordance with variations in the value of a second control quantity, means for adjusting the slider contact of the third circuit in accordance with the operation of said control motor, and means for connecting said slider contacts and the midpoint of the second resistor of each of said bridges into a control circuit, and controlling means for said control motor responsive to current flow in said control circuit.

7. A control system comprising in combination a bridge circuit having two output terminals and including a resistor and a slider contact adjustable along said resistor and forming one of said terminals, means for adjusting said contact in accordance with variations in a control quantity, a control motor, a second bridge circuit including two resistors connected in parallel and two slider contacts, one of which is manually adjustable along one of the last mentioned resistors and the other of which is adjustable along the second of the last mentioned resistors by and in accordance with the operation of said control motor, a switch adjustable between two positions, means cooperating with said switch in one position of the latter to establish a control circuit including the two last mentioned slider contacts and said output terminals, means cooperating with said switch when the latter is in its second position to establish a second control circuit including the last mentioned slider contacts but not including said output terminals, means responsive to and controlling said control motor in accordance with current flow in each of said control circuits, and adjusting means for said second bridge circuit rendered operative by the adjustment of said switch into its second position to increase the potential drop in the resistors of said second bridge circuit.

8. An electrical control system comprising in combination a plurality of separate bridge circuits each of which has two output terminals and includes a resistor and a slider contact adjustable along said resistor and forming one of said output terminals, means connecting all of said output terminals in series in a control circuit, one of said bridge circuits including a second resistor in parallel with the first mentioned resistor in said circuit and a slider contact adjustable along said second resistor, said last mentioned slider contact forming one of said output terminals, one output terminal of another of the bridge circuits being fixed, a reversible control motor, motor energizing means responsive to current flow in said control circuit and operating said control motor in accordance with the direction of current flow in said control circuit to produce a control effect and to adjust one of the slider contacts of said one bridge circuit, means for adjusting the other of said slider contacts of said one bridge circuit in accordance with the direction and extent of the departure of a control quantity from a normal value of the latter, means for adjusting the slider contact of the other one of said bridge circuits, and adjusting means individually associated with said other one of said bridge circuits for adjusting said bridge circuit and thereby varying the effect of a given adjustment of the slider contact of said other one of said bridge circuits on the current flow in the control circuit without affecting the effect of a given adjustment of either of the slider contacts of said one bridge circuit on the current flow in the control circuit.

9. An electrical control system comprising in combination a plurality of separate bridge circuits each of which has two output terminals and includes a resistor and a slider contact adjustable along said resistor and forming one of said output terminals, means connecting all of said output terminals in series in a control circuit, one of said bridge circuits including a second resistor in parallel with said resistor and a slider contact adjustable along said second resistor, said last mentioned slider contact forming one of said output terminals, one output terminal of another of the bridge circuits being fixed, a reversible control motor, motor energizing means responsive to current flow in said control circuit and operating in accordance with the direction of current flow in said control circuit to produce a control effect and to adjust one of the slider contacts of said one bridge circuit, means for adjusting the other of said slider contacts of said one bridge circuit in accordance with the direction and extent of the departure of a control quantity from a normal value of the latter, a reversible reset motor, energizing means for said reset motor responsive to the departure of the control quantity from the normal value thereof and operating said reset motor to adjust the slider contact of the other of said bridge circuits when the value of said control quantity differs from the normal value thereof, and adjusting means individually associated with said other one of said bridge circuits for adjusting said bridge circuit and thereby varying the effect of a given adjustment of the slider contact of said other one of said bridge circuits on the current flow in the control circuit without affecting the effect of a given adjustment of either of the slider contacts of said one bridge circuit on the current flow in the control circuit.

HARRY S. JONES.